United States Patent
Rudolph et al.

(10) Patent No.: US 10,012,839 B2
(45) Date of Patent: *Jul. 3, 2018

(54) SPECTACLE LENS FOR A DISPLAY DEVICE THAT CAN BE FITTED ON THE HEAD OF A USER AND GENERATES AN IMAGE

(71) Applicant: Carl Zeiss Smart Optics GmbH, Aalen (DE)

(72) Inventors: Guenter Rudolph, Jena (DE); Hans-Juergen Dobschal, Kleinromstedt (DE)

(73) Assignee: tooz technologies GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/304,842

(22) PCT Filed: Apr. 16, 2015

(86) PCT No.: PCT/EP2015/058276
§ 371 (c)(1),
(2) Date: Oct. 17, 2016

(87) PCT Pub. No.: WO2015/158831
PCT Pub. Date: Oct. 22, 2015

(65) Prior Publication Data
US 2017/0184850 A1 Jun. 29, 2017

(30) Foreign Application Priority Data
Apr. 17, 2014 (DE) .................. 10 2014 207 495

(51) Int. Cl.
*G02C 1/00* (2006.01)
*G03H 1/00* (2006.01)
(Continued)

(52) U.S. Cl.
CPC ....... *G02B 27/0172* (2013.01); *G02B 6/0001* (2013.01); *G02C 7/02* (2013.01);
(Continued)

(58) Field of Classification Search
CPC ............ G02B 27/0172; G02B 27/0101; G02B 27/0149; G02B 27/145; G02B 27/0103;
(Continued)

(56) References Cited

U.S. PATENT DOCUMENTS 5,369,415 A   11/1994  Richard et al.
6,204,974 B1   3/2001  Spitzer
(Continued)

FOREIGN PATENT DOCUMENTS

DE   102011007811 A1   10/2012
EP      2418073 A1       2/2012
(Continued)

OTHER PUBLICATIONS

International Preliminary Report on Patentability rendered by the International Bureau of WIPO for PCT/EP2015/058276 dated Oct. 27, 2016, 15 pages. (including English translation).

*Primary Examiner* — Dawayne A Pinkney
(74) *Attorney, Agent, or Firm* — Skaar Ulbrich Macari, P.A.

(57) ABSTRACT

A first side of the outer shell of a spectacle lens faces away from the inner shell and forms the front side of the spectacle lens, and the first side of the inner shell faces away from the outer shell and forms the rear side of the spectacle lens. The outer shell includes the coupling-in section, the light guiding channel and the coupling-out section. The inner shell includes an opening which extends from the second side of the inner shell, which faces towards the outer shell, in the direction of the rear side and in which the light guiding channel sits. The coupling-out section lies next to the
(Continued)

opening such that the light bundles coupled out by the coupling-out section enter the inner shell via the second side of the inner shell, run through the inner shell and leave the inner shell via the rear side.

16 Claims, 9 Drawing Sheets

(51) Int. Cl.
    *G02F 1/1335* (2006.01)
    *G03B 21/26* (2006.01)
    *G09G 5/00* (2006.01)
    *G02B 27/01* (2006.01)
    *F21V 8/00* (2006.01)
    *G02C 11/00* (2006.01)
    *G02C 7/02* (2006.01)

(52) U.S. Cl.
CPC ...... *G02C 11/10* (2013.01); *G02B 2027/0178* (2013.01); *G02C 2202/16* (2013.01)

(58) Field of Classification Search
CPC ......... G02B 27/01; G09F 19/18; G03B 21/00; G03B 21/14; G09G 3/003; A61B 3/103; A61B 3/14; A61B 3/113; A61B 3/1225
USPC ...... 359/630–634, 13–14; 349/11; 310/49 R, 310/156.32, 156.33, 156.34, 156.35, 310/266–268, 156.02; 353/11–12, 28, 353/119; 345/7, 9; 351/200, 205–206, 351/210, 221; 340/438, 980, 995.1, 340/815.47, 815.74
See application file for complete search history.

(56) References Cited

U.S. PATENT DOCUMENTS

| | | |
|---|---|---|
| 2002/0030639 A1 | 3/2002 | Shimizu et al. |
| 2002/0036751 A1 | 3/2002 | Tanijiri et al. |
| 2008/0025667 A1 | 1/2008 | Amitai |
| 2010/0171922 A1 | 7/2010 | Sessner et al. |
| 2012/0002294 A1 | 1/2012 | Dobschal et al. |
| 2012/0229367 A1* | 9/2012 | Magyari ............ G02B 27/0172 345/8 |
| 2013/0200540 A1 | 8/2013 | Buchon et al. |
| 2015/0036223 A1 | 2/2015 | Dobschal et al. |
| 2015/0260992 A1* | 9/2015 | Luttmann ........... G02B 27/0172 359/631 |
| 2016/0313557 A1* | 10/2016 | Schmidt ................. G02B 3/08 |

FOREIGN PATENT DOCUMENTS

| | | | |
|---|---|---|---|
| FR | 2925172 A1 | 6/2009 | |
| WO | 2008090000 A1 | 7/2008 | |
| WO | 2011095379 A2 | 8/2011 | |
| WO | WO 2015044297 A1 * | 4/2015 | ............... G02B 3/08 |

* cited by examiner

SPECTACLE LENS FOR A DISPLAY DEVICE THAT CAN BE FITTED ON THE HEAD OF A USER AND GENERATES AN IMAGE

PRIORITY

This application claims the benefit of German Patent Application No. 102014207495.9 filed on Apr 17, 2014, which is hereby incorporated herein by reference in its entirety.

FIELD

The present invention relates to a spectacle lens for a display device that can be fitted on the head of a user and generates an image, wherein the spectacle lens comprises a front side and a rear side, a coupling-in section and a coupling-out section, spaced apart from the coupling-in section, as well as a light guiding channel, which is suitable for guiding light bundles of pixels of the generated image, which are coupled into the spectacle lens via the coupling-in section of the spectacle lens, in the spectacle lens to the coupling-out section, by which they are coupled out of the spectacle lens.

BACKGROUND

It is desirable to be able to produce a spectacle lens with a thickness which is as small as possible, wherein at the same time a good imaging of the image should be ensured when using the spectacle lens in a display device.

SUMMARY

An object of the invention is to provide a spectacle lens that can be produced with a small thickness and good imaging properties.

The disclosure includes a spectacle lens that is constructed with several shells and comprises an outer shell and an inner shell which is joined to the outer shell, wherein the first side of the outer shell which faces away from the inner shell forms the front side of the spectacle lens and the first side of the inner shell which faces away from the outer shell forms the rear side of the spectacle lens, wherein the outer shell comprises the coupling-in section, the light guiding channel and the coupling-out section, the inner shell comprises an opening which extends from the second side of the inner shell, which faces towards the outer shell, in the direction of the rear side and in which the light guiding channel sits, wherein the coupling-out section lies next to the opening, with the result that the light bundles coupled out by the coupling-out section enter the inner shell via the second side of the inner shell, run through the inner shell and leave the inner shell via the rear side.

Through this two-shell structure in combination with the opening, the thickness of the spectacle lens can be kept as small as possible. At the same time, the light guiding channel, which is part of the outer shell, can be formed such that the desired good imaging properties can be ensured.

In particular, the opening can extend from the second side of the inner shell to the first side of the inner shell. The opening thus extends over the whole thickness of the inner shell and can also be referred to as a through-opening.

The opening can, when seen in top view onto the inner shell, be bordered on all sides by areas of the inner shell or be open at least on one side. In particular, the opening, when seen in top view onto the inner shell, can be formed U-shaped.

It is further possible that the opening does not extend over the whole thickness of the inner shell. In this case, there is thus a corresponding recess which extends from the second side into the inner shell. The depth of the recess is chosen in particular such that the light guiding channel lying in the recess is not in contact with the base of the recess, with the result that an air gap is still present. However, it is also possible that there is no air gap and the light guiding channel is in contact with the base of the recess.

The front side and/or the rear side of the spectacle lens can be formed curved. In particular, the rear side can have a curvature which is chosen such that a correction of defective vision is brought about. This leads to the advantage that the desired correction of defective vision is also present for the coupled-out light bundles, as these are coupled out such that they exit the spectacle lens via the rear side of the inner shell.

The guiding and coupling out of the light bundles with the spectacle lens can thus be optimized with respect to a desired imaging by means of the outer shell. Independently thereof, the desired correction of defective vision can be optimized by means of the inner shell. With the spectacle lens according to the invention, therefore, on the one hand the imaging properties can be designed and set via the outer shell, and on the other hand the correction of defective vision properties can be designed and set via the inner shell, independently of each other.

In particular, the inner and outer shell cab be formed from the same materials.

In addition, the inner shell can be joined flat to the outer shell (e.g. glued or cemented with an optical cement or optical adhesive).

Preferably, the sides of the inner and outer shell which face towards each other are formed complementary to each other.

In particular, these sides which face towards each other can be spherically curved.

In addition, the outside and/or the inside can be spherically curved.

The coupling-out section can comprise several reflective deflecting surfaces arranged next to each other. The reflective deflecting surfaces can also be referred to as reflective facets. They can have a reflectivity of almost 100% and in this case be referred to as mirror surfaces. It is also possible for them to have a lower reflectivity and thus be formed partially transparent.

The reflective deflecting surfaces can in each case be formed flat or curved. Furthermore, the deflecting surfaces can reproduce a curved reflecting surface in a Fresnel manner which also has an imaging property in addition to a pure beam deflection.

The coupling-out section can be buried in the outer shell. In particular, the coupling-out section can be formed such that the front side of the spectacle lens is a smooth, continuous surface.

The light guiding channel can comprise two boundary surfaces which are opposite each other, on which the light bundles are reflected for guiding.

In particular, one of the boundary surfaces of the light guiding channel can be formed by a section of the first side of the outer shell.

In addition, the boundary surface of the light guiding channel which faces away from the first side of the outer shell can be formed such that it has an imaging property.

The reflection on the boundary surfaces can take place by total internal reflection. However, it is also possible for at least one of the boundary surfaces (or both) to comprise a reflecting or partially reflecting coating. In particular, the coating can be a metallic coating. Furthermore, the coating can be formed such that it reflects light bundles with a first polarization state and transmits light bundles with a polarization state which is orthogonal to the first polarization state. The reflecting coating can furthermore be formed as an interference layer system.

Furthermore, the light guiding channel can project with respect to a second side of the outer shell which faces towards the inner shell.

The coupling-in section can be formed in an edge area of the spectacle lens and the coupling-out section can be formed in a central area of the spectacle lens.

The inner shell and the outer shell can in each case be formed in one piece. However, it is also possible for the inner shell and/or the outer shell to be formed in several parts.

In particular, the outer shell can be formed with several shells. It can e.g. comprise at least two partial shells. The same applies to the inner shell.

If the outer shell is formed with several shells, the coupling-out section can lie between two partial shells of the outer shell. At least one of the partial shells can be formed as a film. For example, as a PC film. The film can have an inherent stability, with the result that it retains its shape without the action of further forces with the exception of gravity. However, the film does not have to have an inherent stability. In particular, the film can be formed flexible.

The outer partial shell, which forms the front side of the spectacle lens, can also be formed as cover shell.

The materials of the partial shells of the outer shell can be the same or different. The same applies to the materials of the partial shells of the inner shell. All partial shells of the outer and of the inner shell can also be formed from the same material or from different materials.

The first side of the outer shell which faces away from the inner shell and which forms the front side of the spectacle lens can comprise a coating and/or an anti-reflection coating. For example, an anti-reflection coating and/or a hard coating can be formed on the first side. Further coatings which are customary in the field of spectacle lenses can also be provided.

The spectacle lens can be formed such that the light guiding channel lies exclusively in the outer shell. However, it is also possible for the light guiding channel to run at least partially through an area in the inner shell. In particular, part of the light guiding channel can lie in an area of the inner shell which adjoins the opening of the inner shell.

Furthermore, it is possible for an area with a partially reflective coating or a reflective coating to be formed next to the opening, with the result that the portion of the light bundles reflected on the partially reflective or reflective coating is guided in the inner shell and then strikes the coupling-out section. Also in this case, part of the light guiding channel lies in the inner shell. The partially reflective coating or reflective coating can in particular be provided between the outer and inner shell. The partially reflective or reflective coating can thus be formed on the second side of the inner shell and/or on the second side of the outer shell which faces towards the inner shell.

Furthermore, a display device is provided, with a holder that can be fitted on the head of a user, an image-generating module secured to the holder, which generates an image, and an imaging optical system secured to the holder, which comprises a spectacle lens according to one of the above claims and which, when the holder is fitted on the head of the user, images the generated image such that the user can perceive it as a virtual image.

The imaging optical system can comprise the spectacle lens as the only optical element. However, it is also possible for the imaging optical system to comprise, in addition to the spectacle lens, also at least one further optical element. In particular, the outer shell can be formed in one piece together with the at least one further optical element. Alternatively, it is possible for the outer shell to be joined to the at least one further optical element (e.g. through cementing or bonding). Furthermore, the at least one further optical element can be spaced apart from the outer shell.

The outer shell, in a view from above, can have an L-shape together with the at least one optical element. The at least one further optical element can thus extend in the direction of a conventional temple stem. In particular, it can be part of the temple stem.

The at least one optical element can comprise one or more imaging optical surfaces (in transmission and/or reflection) which can be optimized for generating an imaging of the generated image for the user of the display device which is as error-free as possible.

The at least one further optical element can be e.g. a collimation optical system which is arranged between the spectacle lens and the image-generating module, with the result that the light bundles from the image-generating module can be coupled into the spectacle lens as collimated bundles.

Furthermore, the display device can comprise a control unit which actuates the image-generating module.

The image-generating module can in particular comprise a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can in particular be formed such that it generates a monochromatic or a multi-coloured image.

The display device can comprise further elements known to a person skilled in the art which are necessary for its operation.

It is understood that the features named above and those yet to be explained below can be used not only in the stated combinations but also in other combinations or alone, without departing from the scope of the present invention.

Figure 1:
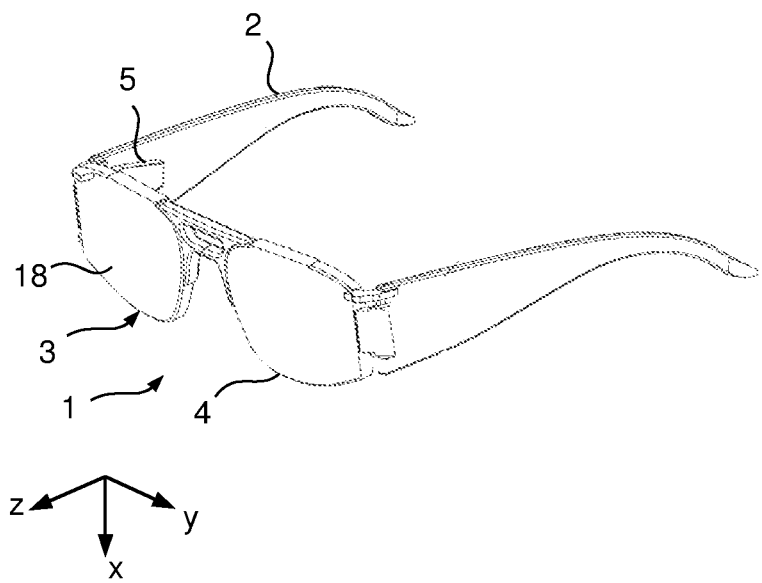
FIG. 1 is a schematic perspective representation of an example embodiment of the display device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as is described below.

For this, the display device 1 comprises an image-generating module 5, which can be arranged in the area of the right-hand temple stem of the holder 2, as is represented schematically in FIG. 1. The image-generating module 5 can comprise a two-dimensional image-generating element 6 (FIG. 2), such as e.g. an OLED, an LCD or an LCoS chip or a tilting mirror matrix, with a plurality of pixels arranged e.g. in columns and rows.

The spectacle lenses 3 and 4, and in particular the first spectacle lens 3, are only described together with the display device 1 according to the invention by way of example. The spectacle lenses 3, 4, or at least the first spectacle lens 3, are in each case formed individually as a spectacle lens 3, 4 according to the invention or as an optical element according to the invention. The optical element according to the invention can also be used in another context than with the display device 1 described here. Therefore, the optical element, when it is formed as a spectacle lens, can, of course, also be formed as second spectacle lens 4.

Figure 2:
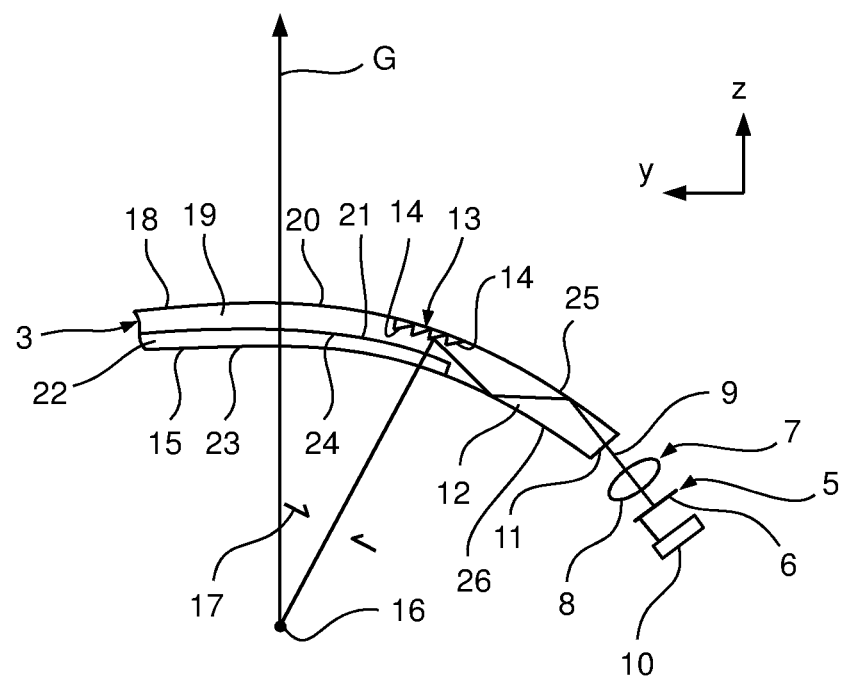
FIG. 2 is an enlarged partial sectional view of the first spectacle lens including a schematic representation of the image-generating module.

As can best be seen from the enlarged schematic partial sectional view in FIG. 2, the display device 1 comprises an imaging optical system 7 which contains an optical element 8 arranged between the image-generating element 6, or the imaging system 6, and the first spectacle lens 3. In addition, the first spectacle lens 3 itself also serves as part of the imaging optical system 7.

A light bundle 9 can emerge from each pixel of the imaging system 6. The desired image can be generated by correspondingly actuating the pixels of the imaging system 6 by means of a control unit 10, which can be part of the image-generating module 5. In FIG. 2, the beam path of a light beam is drawn in to represent the light bundles 9, with the result that the light beam 9 is also discussed below.

The light beam 9 emerging from the imaging system 6 runs through the optical element 8 and enters the first spectacle lens 3 via a coupling-in section 11 (here the end face of the first spectacle lens 3), and is guided in this along a light guiding channel 12 to a coupling-out section 13. The coupling-out section 13 comprises several reflective deflecting surfaces 14 (which can also be referred to as reflective facets) arranged next to each other on which a reflection of the light beams 9 takes place in the direction of a rear side 15 of the first spectacle lens 3, with the result that the light beams 9 exit the first spectacle lens 3 via the rear side 15.

Thus, when a user is wearing the display device 1 according to the invention on his head as intended, he can perceive the image generated by means of the imaging system 6 as a virtual image when he looks at the coupling-out section 13. In the embodiment described here, the user must look towards the right by approx. 40° relative to the direction of view G of a forward view. In FIG. 2, the centre of rotation 16 of the user's eye as well as the eyebox 17 or the exit pupil 17 of the imaging optical system 7 is drawn in for clarification. The eyebox 17 is the area which is provided by the display device 1 and in which the user's eye can move and he can still always see the generated image as a virtual image.

Although in the described embodiment the coupling-in is carried out via the end face of the first spectacle lens 3 and thus the coupling-in section 11 is formed on the end face of the first spectacle lens 3, it is also possible to carry out a coupling-in via the rear side 15 of the first spectacle lens.

As is shown in the schematic representation in FIG. 2, both the rear side 15 and the front side 18 of the first spectacle lens 3 are formed curved.

Furthermore, the first spectacle lens 3, as can be learned in particular from the representations in FIGS. 2 to 6, is formed with two shells and comprises an outer shell 19 with a first and second side 20 and 21 and an inner shell 22 with a first and second side 23 and 24.

Figure 3:
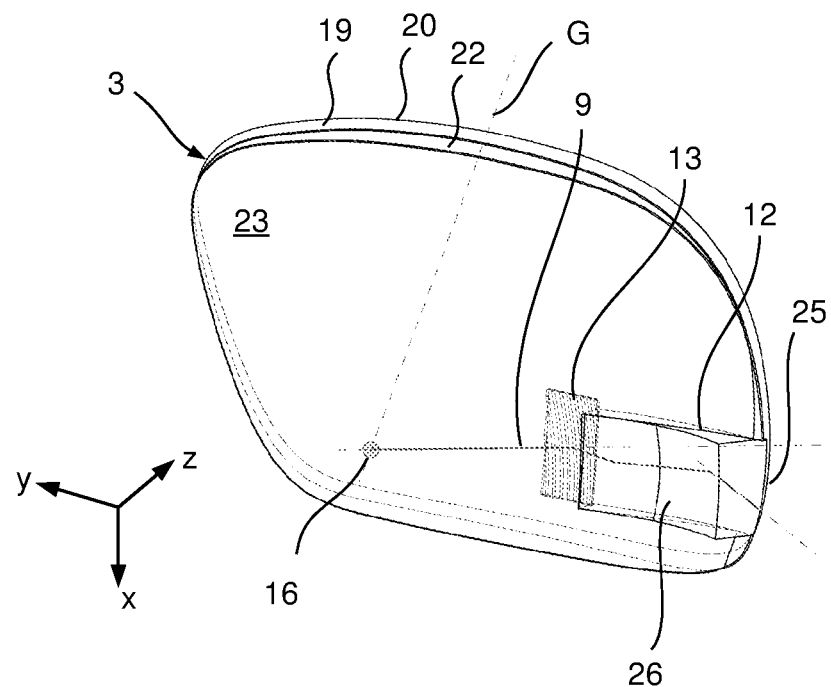
FIG. 3 is a perspective representation of the first spectacle lens of the example embodiment according to FIGS. 1 and 2.

The first side 20 of the outer shell 19 forms the front side 18 of the first spectacle lens 3 and the first side 23 of the inner shell 22 forms the rear side 15 of the first spectacle lens 3. The second side 21 of the outer shell 18 and the second side 24 of the inner shell 22, which are facing towards each other, have complementary curvatures, with the result that they can be joined flat to each other, as is indicated in FIGS. 2 and 3.

The outer shell 19 comprises the coupling-in section 11, the light guiding channel 12 and the coupling-out section 13. The light guiding channel 12 is formed such that the desired guiding of the light beams 9 from the coupling-in section 11 to the coupling-out section 13 takes place. This can take place e.g. by total internal reflection on the boundary surfaces 25 and 26 of the light guiding channel 12 which are opposite in the z-direction. Of course, it is also possible that a reflective coating is formed on the boundary surface 25 and/or on the boundary surface 26 which brings about the desired reflection of the light beams 9. The reflectivity of the reflective coating can e.g. be as great as possible (approx. 100%) or lower. The reflective coating can thus be formed as mirror layer or as partially reflective layer.

In the embodiment described here, the boundary surface 25 is part of the first side 20 of the outer shell 19 and thus part of the front side 18. The boundary surface 26, in contrast, is not part of the second side 21 of the outer shell, but rather is a separately formed boundary surface, which, in addition to the light guiding, can also provide an optically imaging property, in order e.g. to reduce imaging errors. The light guiding channel 12 thus projects with respect to the second side 21 of the outer shell 19 and thus has a larger thickness in the z-direction than the outer shell 19.

In order to nevertheless be able to provide an overall thin first spectacle lens 3, the inner shell 22 comprises an opening 27, which extends from the second side 24 of the inner shell 22 in the direction of the first side 23 of the inner shell 22. In the embodiment example described here, the opening extends over the whole thickness (extent in the z-direction) of the inner shell 22. The dimensions of the opening 27 are such that in the assembled state the light guiding channel 12 sits in it and the coupling-out section 13 lies next to the opening 27 and thus in front of the second side 24 of the inner shell 22.

This arrangement can advantageously be used e.g. for a first spectacle lens with correction of defective vision, as the curvature of the first side 23 of the inner shell 22 can be chosen such that the desired correction of defective vision is achieved. This then automatically leads to a user of the display device 1 with such a first spectacle lens 3 also being able to perceive the virtual image in a likewise sharp manner, as he perceives this via the corrective surface or first side 23 of the inner shell 22. In other words the coupling-out of the light bundles 9 takes place by reflection on the reflective facets 14 of the coupling-out section 13 in such a way that the light bundles 9 are reflected in the direction of the inner shell 22, enter the inner shell 22 via the second side 24 of the inner shell 22, run through it, and exit the inner shell 22 via the first side 23.

With the spectacle lens 3 according to the invention it is thus possible to realize the requirements for the correction of defective vision through the inner shell 22 and the requirements for the generation of the virtual image through the outer shell 19. The inner shell 22 can therefore also be referred to as corrective lens 22 and the outer shell 19 as data lens 19. There is thus a separation of function between correction of defective vision and imaging for the virtual image, with the result that the outer shell 19 for the imaging and the inner shell 22 for the correction of defective vision can be optimized independently of each other. It is thus also possible to provide, for the imaging of the virtual image, an outer shell 19 which only needs to be combined with an inner shell 22 adapted individually to the respective user in order to be able to provide a display device 1 which is adapted individually to the user.

In the embodiment described here, the two sides 20, 21 of the outer shell 19 are spherically curved and the first side 20 of the outer shell 19 has a radius of curvature of 94 mm and the second side 21 of the outer shell 19 has a radius of curvature of 92 mm. The thickness of the outer shell is thus 2 mm. Only the light guiding channel 12 has a larger thickness, which can be e.g. 4 mm or larger.

The second side 24 of the inner shell 22 is spherically curved and has a radius of curvature which corresponds to the radius of the second side 21 of the outer shell 19. Here, this is thus a radius of 92 mm. The first side 23 of the inner shell 22 is spherically curved and has the radius of curvature required to correct the defective vision of the user (e.g. 150 mm when using PMMA as material for the inner shell 22). Of course, the first side 23 of the inner shell can also be aspherically curved. The material of the outer shell 19 is preferably the same as the material of the inner shell 22. The thickness of the inner shell 22 depends substantially on the difference between the radius of the second side 24 of the inner shell 22 and of the first side 23 of the inner shell 22, and in the example described here is approx. 3 mm.

As already mentioned, the materials of the inner and outer shell 22 and 19 are preferably the same, with the result that they have an identical refractive index. The inner and outer shell 22 and 19 are preferably glued over the whole surface, with the result that a compact first spectacle lens 3 is generated, in which only the opening 27 reaches around the light guiding channel 12.

The first spectacle lens 3 of the embodiment described here provides a correction of +2 dioptres.

Figure 5:
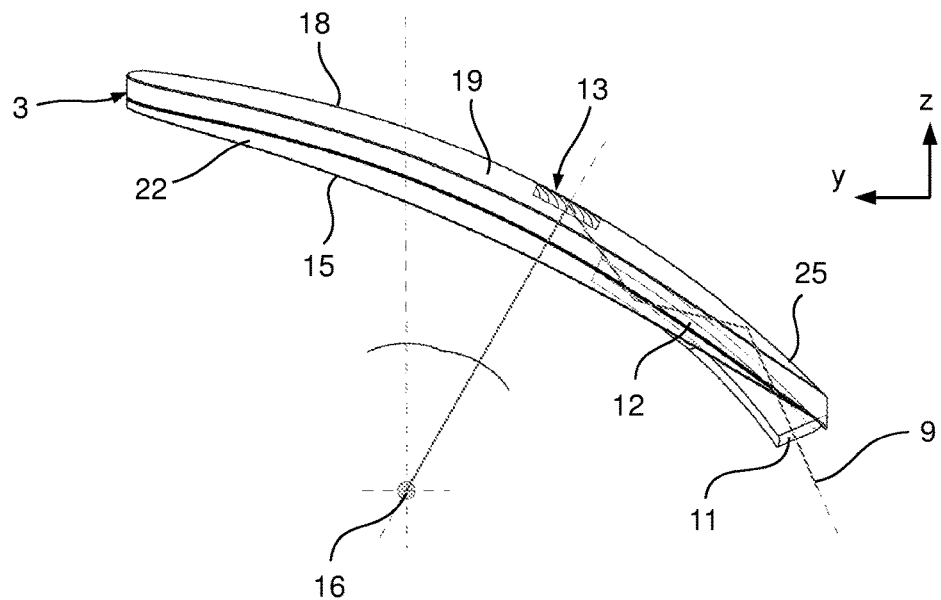
FIG. 5 is a view of the first spectacle lens according to FIG. 3 from above.
Figure 6:
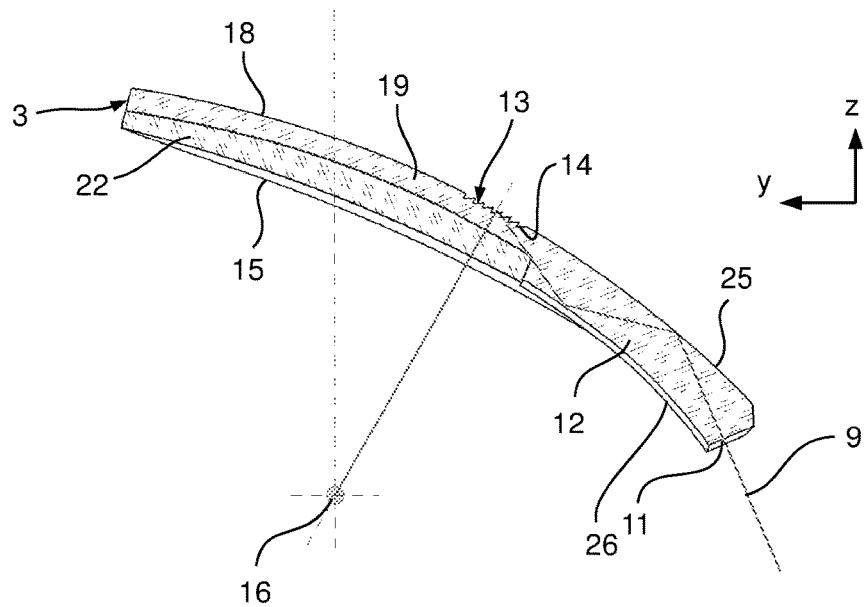
FIG. 6 is a sectional view of the first spectacle lens from FIG. 3.
Figure 7:
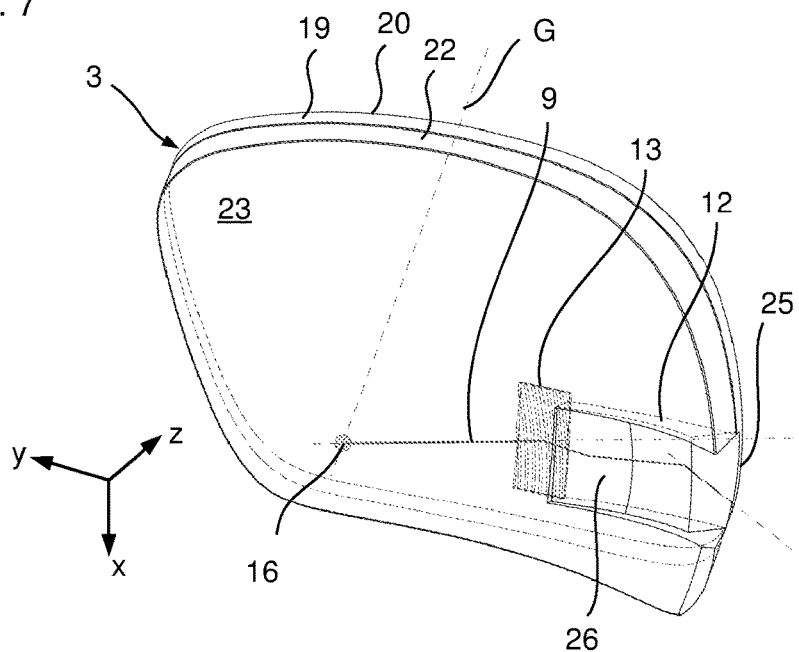
FIG. 7 is a perspective view of a further example embodiment of the spectacle lens according to the invention.
Figure 8:
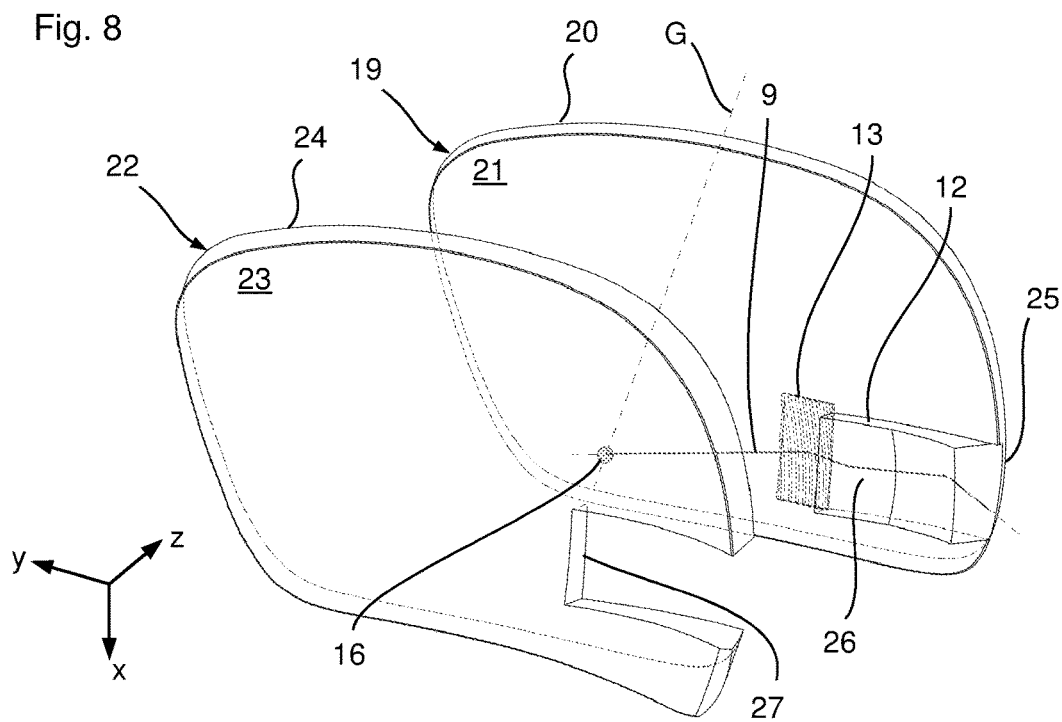
FIG. 8 is a perspective exploded representation of the spectacle lens according to the invention according to FIG. 7.
Figure 9:
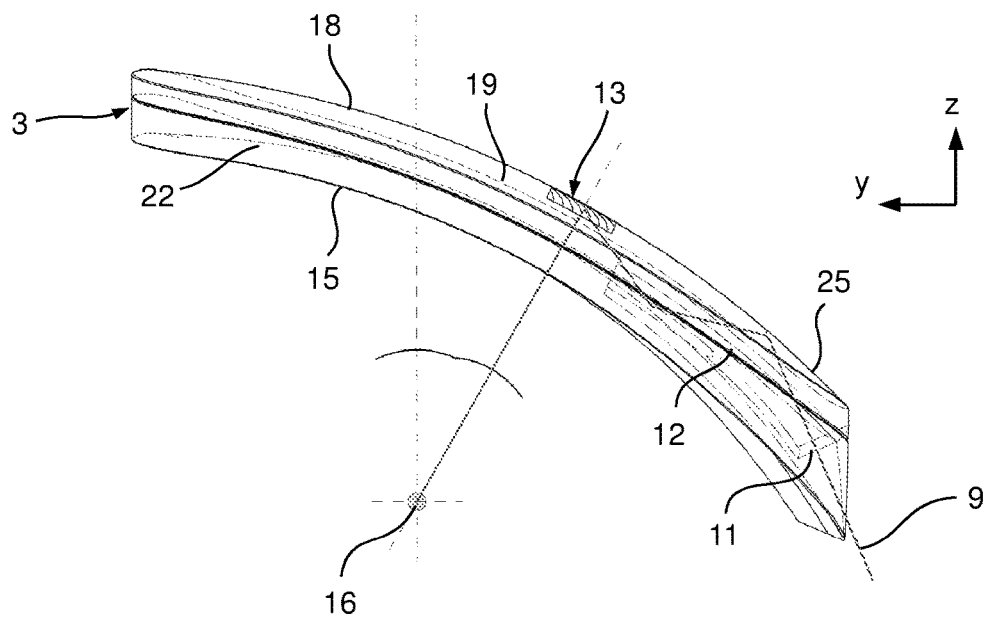
FIG. 9 is a view of the spectacle lens according to the invention from FIG. 7 from above.
Figure 10:
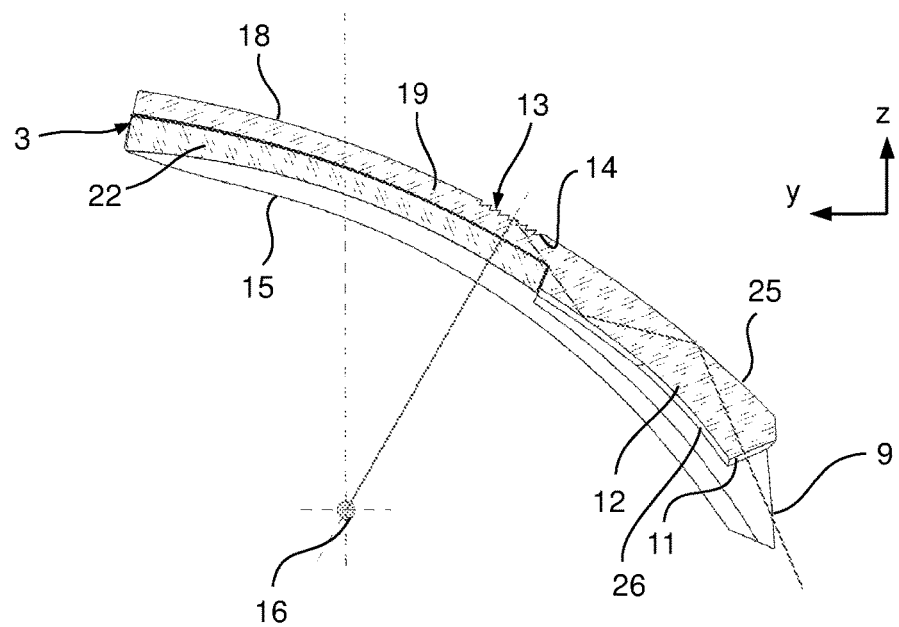
FIG. 10 is a sectional view of the spectacle lens according to the invention according to FIG. 7.

The two-shell structure is equally easy to recognize in the view from above according to FIG. 5 and the sectional view of FIG. 6. As is represented in particular in FIG. 6, the reflective facets 14 are formed on the front side 18 of the first spectacle lens 3. In particular, the reflective facets 14 are filled with a transparent material (not shown), with the result that a continuous smooth front side 18 is present. Preferably, the same material is used as material for the filling as that from which the remaining part of the outer shell 19 is formed.

In a modification which is not shown, the reflective deflecting surfaces 14 can also be spaced apart from the front side 18 and are thus formed buried in the outer shell 19.

In the described design of the light guiding channel 12, because of the boundary surface 26 optimized with respect to the imaging of the virtual image, there is a distortion of the view of the surroundings. As, however, the light guiding channel 12 lies out on the periphery of the normal field of view, this distortion is not disruptive for the user.

In a further embodiment of the spectacle lens according to the invention according to FIGS. 7 to 10, a correction of −2 dioptres is provided. In this embodiment, the outer shell 19 is identical to the outer shell 19 of the embodiment described in connection with FIGS. 1 to 6. Only the inner shell 22 is adapted accordingly in order to realize the desired correction of defective vision. The same elements are therefore referred to with the same reference numbers and reference is made to the description relating to FIGS. 1 to 6.

Figure 11:
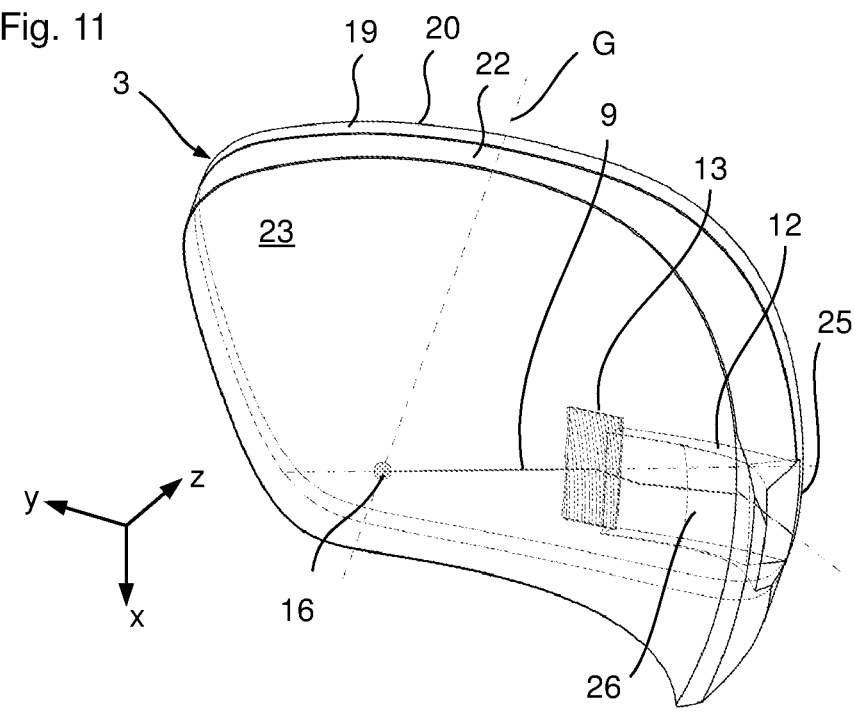
FIG. 11 is a perspective representation of a further example embodiment of the spectacle lens according to the invention.
Figure 12:
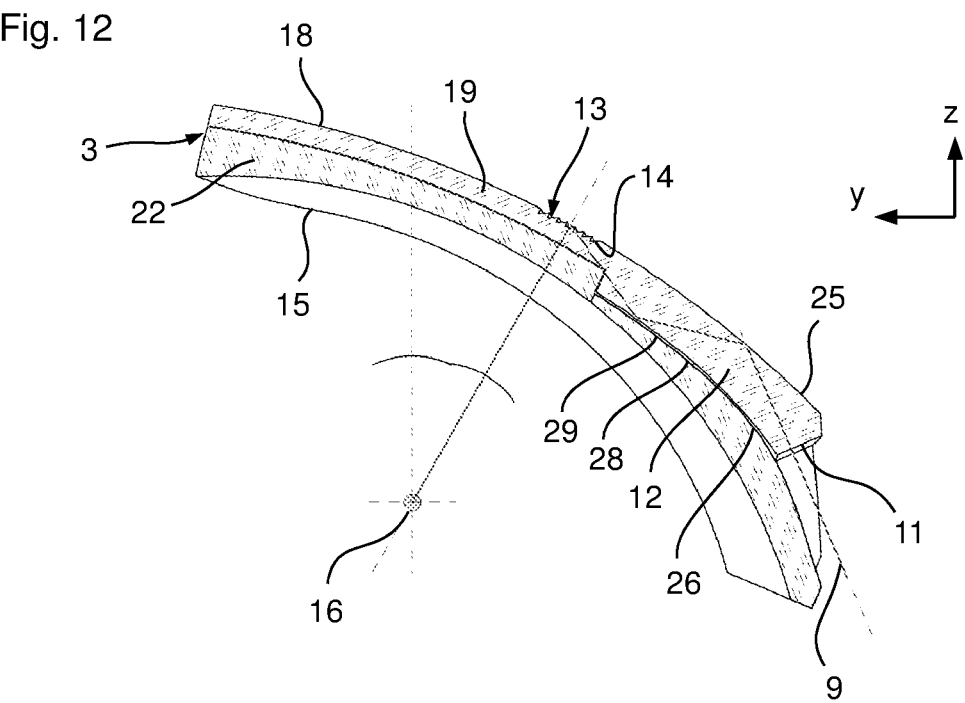
FIG. 12 is a sectional view of the spectacle lens according to the invention according to FIG. 11.

In the embodiments described previously, the opening 27 extends in each case over the whole thickness of the inner shell 22. It can thus also be said that the opened section is punched out. A laterally open through-opening is thus present. However, it is also possible for the opening 27 to extend not over the whole thickness of the inner shell 22, but rather starting from the second side 24 of the inner shell 22 to a predetermined depth in the inner shell 22. In this case, the depth of the opening 27 is preferably chosen, as is indicated in particular in FIG. 12, such that in the assembled state an air gap 29 is present between the boundary surface 26 of the light guiding channel 12 and a base 28 of the opening 27. In the embodiment shown in FIGS. 11 and 12, in which such an opening 27 is formed, the inner shell 22 is designed such that a correction of −4 dioptres is provided. If a reflective coating is formed on the boundary surface 26, the air gap 29 can be provided or it can be dispensed with.

Figure 4:
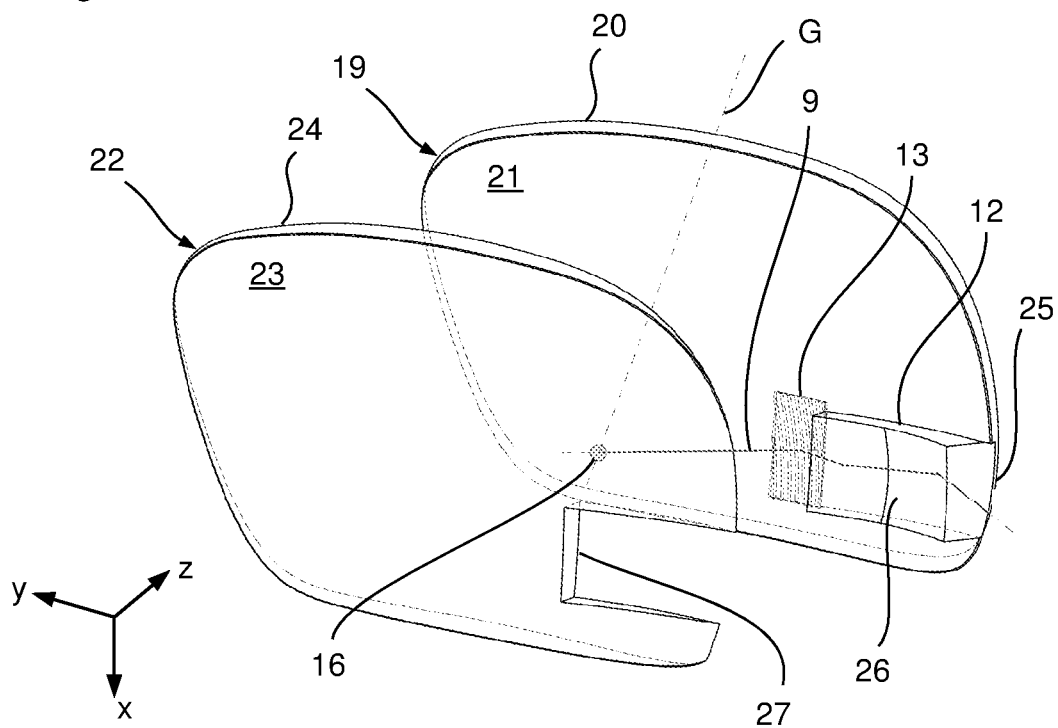
FIG. 4 is a perspective exploded representation of the first spectacle lens according to FIG. 3.
Figure 13:
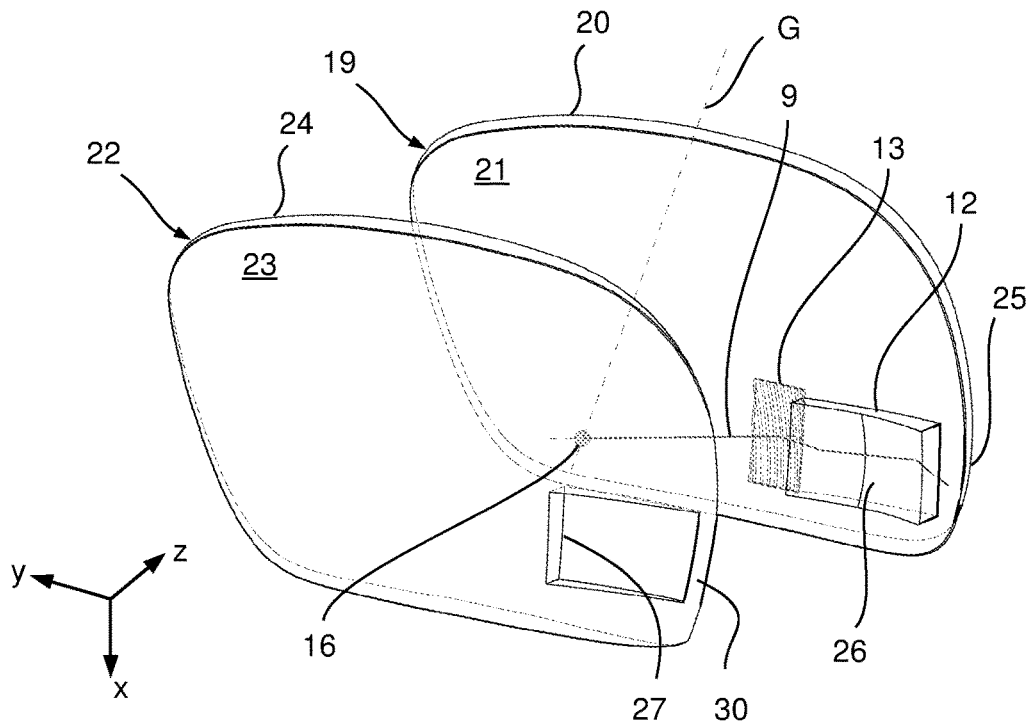
FIG. 13 is a perspective exploded representation of a modification of the spectacle lens according to the invention according to FIG. 3.

In FIG. 13, in a representation according to FIG. 4, a modification of the embodiment, shown in FIG. 4, of the spectacle lens 3 according to the invention is represented.

In contrast to the embodiment shown in FIG. 4, in the spectacle lens according to FIG. 13 the opening 27 is formed as a through-opening which is also bordered laterally by a section 30 of the inner shell 22. In this case, the light guiding channel 12 is, of course, adapted accordingly. The coupling-in thus no longer takes place via the end face of the spectacle lens 3, but rather from behind via the rear side 15.

Of course, the opening 27 can also be formed such that it is open below (seen in the x-direction) or above. This also depends substantially on where the coupling-out section 13 is to be positioned. Of course, an opening 27 which is open below and laterally or above and laterally is also possible.

Figure 14:
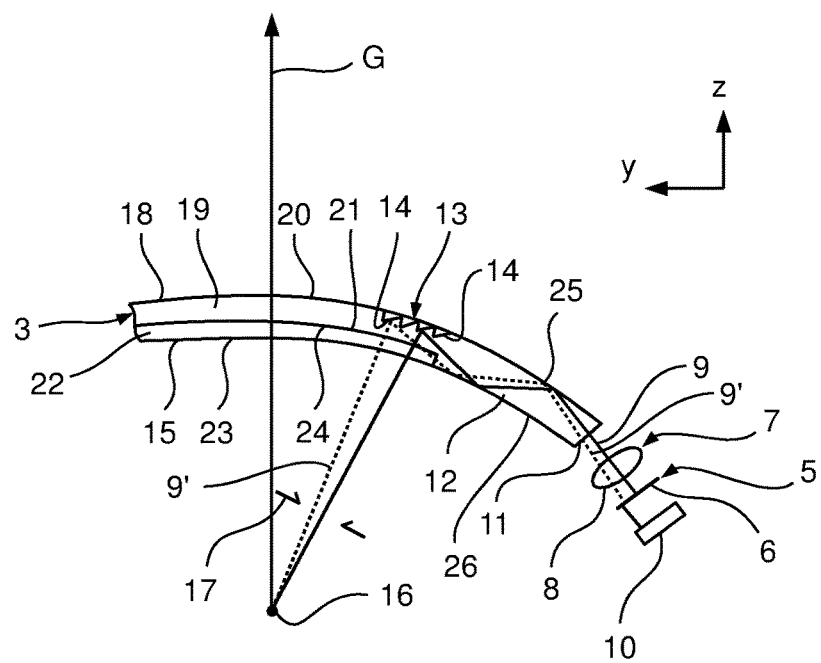
FIG. 14 is an enlarged partial sectional view according to FIG. 2.

In FIG. 14, the enlarged partial sectional view according to FIG. 2 is shown, wherein an additional light beam 9' which emerges from the imaging system 6 is drawn in. As can be learned from this representation, the light beam 9' runs through the inner shell 22 in the area next to the opening 27 before it in turn enters the outer shell 19 and then strikes the coupling-out section 13. The light guiding channel 12 can thus partially also extend through the inner shell 22. This applies to all described embodiments. However, it is also possible for the light guiding channel 12 to be formed such that it only runs in the outer shell 19.

Figure 15:
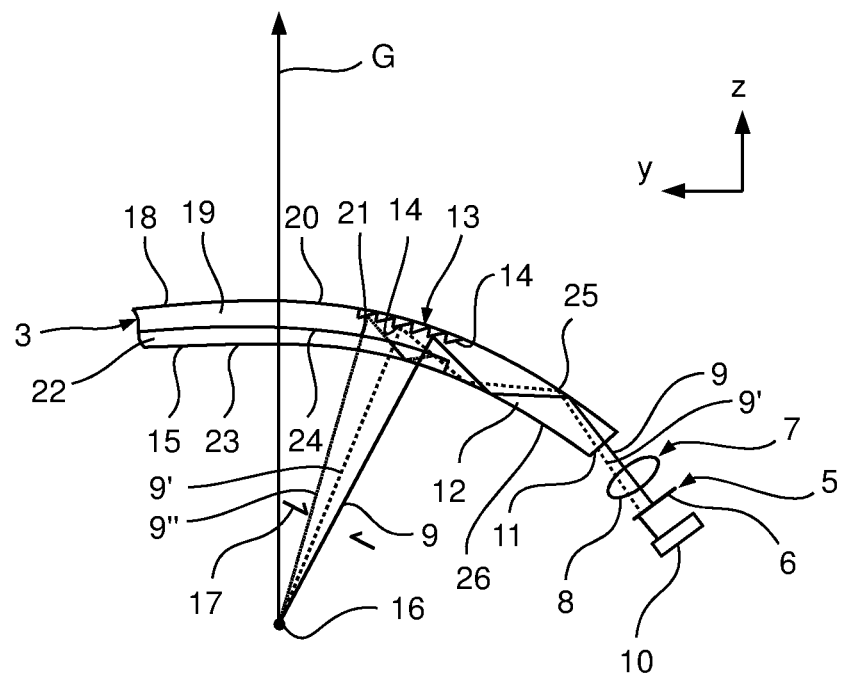
FIG. 15 is an enlarged partial sectional view according to FIG. 14 of a further example embodiment of the first spectacle lens.
Figure 16:
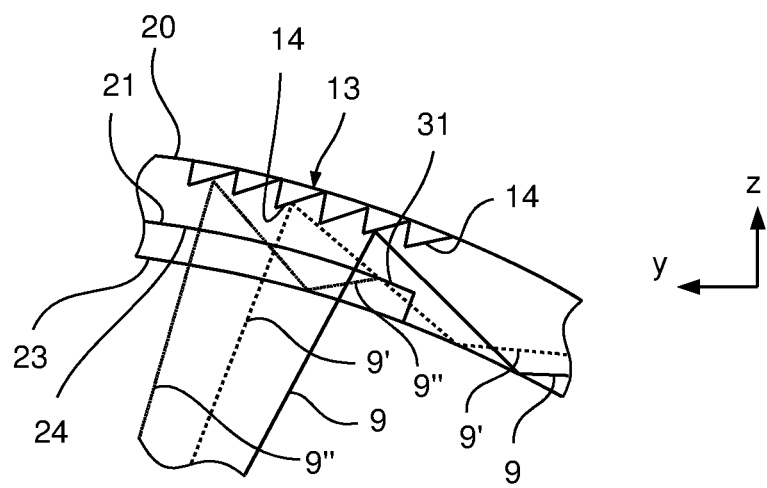
FIG. 16 is an enlarged detailed representation of the coupling-out area from FIG. 15.

In FIG. 15, in the same manner as in FIG. 14, a further embodiment of the display device according to the invention is represented. In this embodiment, the dimensions of the partial area of the light guiding channel 12 extending in the inner shell 22 are larger than in the case of the embodiment according to FIG. 14. This is achieved in that a partially reflecting coating 31 is formed in the area next to the opening between the outer and inner shell 19, 22 (FIG. 16), with the result that part of the light beam 9' is not transmitted into the outer shell 19, but rather is reflected to the second side 23 of the inner shell 22. This reflected light beam 9'' is reflected on the second side 23 towards the coupling-out section 13 (e.g. by total internal reflection or by an appropriately provided reflective or partially reflective coating), with the result that the desired coupling-out can then be brought about via the coupling-out section 13. In this way, the lateral extent of the coupling-out section 13 can be enlarged. This type of enlargement of the coupling-out section 13 can be easily recognized in the enlarged detailed representation from FIG. 16. In the same manner, the splitting of the light beam 9' on the partially reflective coating 31 is clearly visible.

Figure 17:
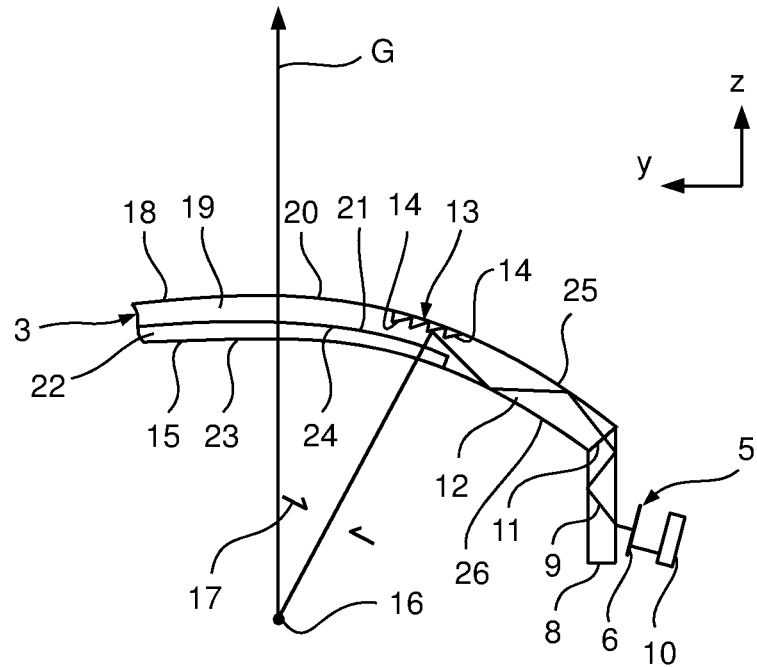
FIG. 17 is an enlarged partial sectional view according to FIG. 2 of a further example embodiment of the first spectacle lens.

In FIG. 17, in the same manner as in FIG. 2, a development of the display device according to the invention is represented. In this development, the optical element 8 is joined to the outer shell 19. The joining can take place e.g. through cementing or bonding via the coupling-in section 11, or the end face 11, of the outer shell 19. To simplify the representation, the optical element 8 is represented with straight boundary surfaces. However, the boundary surfaces can be formed curved in the area of the passage and reflection of the light bundles 9 and thus provide an imaging property. Also in order to simplify the representation, the image-generating module 5 is drawn in laterally next to the optical element 8. However, it can also be positioned above or below or in any other position relative to the optical element 8. The optical element 8 can also be referred to as a tube. As can be seen in the representation from FIG. 17, the optical element 8 and the outer shell 19 are joined to each other such that they form an L-shape. The optical element 8 thus extends in the manner of a temple stem away from the outer shell 19. The optical element 8 can be part of a temple stem (not drawn in) or another holder for the wearing of the imaging optical system on the head.

Figure 18:
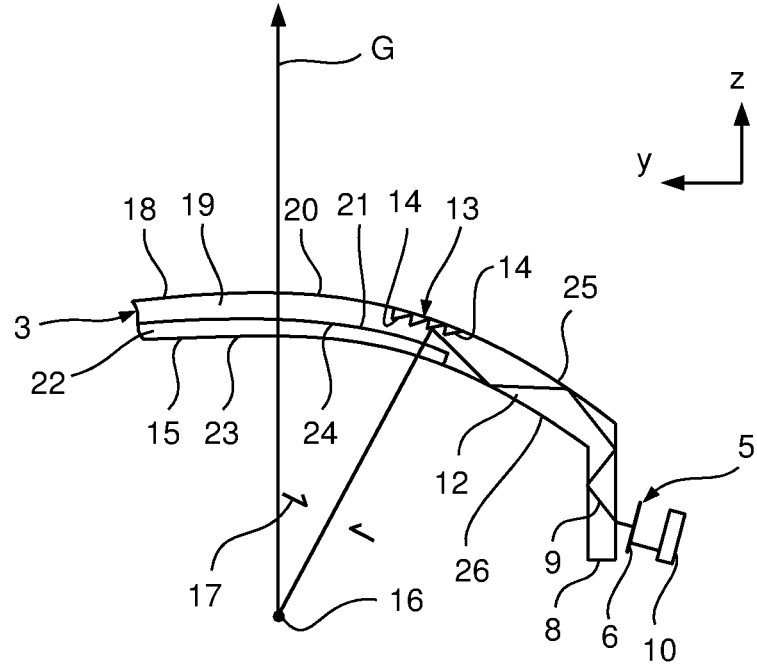
FIG. 18 is an enlarged partial sectional view according to FIG. 17 of a modification of the first spectacle lens according to the invention.

In FIG. 18, a modification of the embodiment from FIG. 17 is shown. In this modification, the outer shell 19 is formed in one piece with the optical element 8. This can be produced for example by means of injection moulding.

In the display device 1 according to the invention, the reflection of the virtual image into the user's field of view takes place via the first spectacle lens 3. Of course, a reflection via the second spectacle lens 4 is also possible. In addition, the display device 1 can be formed such that items of information or virtual images are reflected via both spectacle lenses 3, 4. The reflection can take place such that a three-dimensional image impression results. However, this is not absolutely necessary.

The spectacle lenses 3, 4 can have a refractive power of zero or a refractive power different from zero (in particular to correct vision defects). As is shown in the figures, both the front side 11 and the rear side 12 of the spectacle lens 3 are formed curved. In particular, the front side 11 can be spherically curved. If the spectacle lens has a refractive power different from zero, in order to correct defective vision, as a rule the curvature of the rear side 15 is chosen appropriately in order to achieve the appropriate correction. The rear side 15 can have a curvature which deviates from the spherical form.

The holder 2 does not have to be formed as a spectacles-type holder. Any other type of holder with which the display device can be fitted or worn on the head of the user is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention

The invention claimed is:

1. A spectacle lens for a display device that can be fitted on the head of a user and generate an image, the spectacle lens comprising:
   a front side and a rear side;
   a coupling-in section and a coupling-out section spaced apart from the coupling-in section;
   a light guiding channel configured to guide light bundles of pixels of the generated image, which are coupled into the spectacle lens via the coupling-in section of the spectacle lens, in the spectacle lens to the coupling-out section, by which they are coupled out of the spectacle lens;

an outer shell comprising a first material;

an inner shell comprising a second material which is joined to the outer shell, wherein a first side of the outer shell faces away from the inner shell and forms the front side of the spectacle lens, and a first side of the inner shell faces away from the outer shell and forms the rear side of the spectacle lens, wherein the first material of the outer shell includes the coupling-in section, the light guiding channel and the coupling-out section, wherein the second material of the inner shell comprises an opening defined into the second material which extends from a second side of the inner shell, which faces towards the outer shell, in a direction of the rear side and in which the light guiding channel is disposed, and wherein the coupling-out section lies adjacent to the opening such that the light bundles coupled out of the first material by the coupling-out section enter the second material of the inner shell via the second side of the inner shell, run through the material of the inner shell and leave the inner shell via the rear side.

2. The spectacle lens according to claim 1, wherein the opening extends from the second side of the inner shell to the first side of the inner shell.

3. The spectacle lens according to claim 1, wherein the rear side has a curvature which such that a correction of defective vision is provided.

4. The spectacle lens according to claim 1, wherein the inner shell and the outer shell each comprise the same material.

5. The spectacle lens according to claim 1, wherein the inner shell is joined flat to the outer shell.

6. The spectacle lens according to claim 1, wherein the coupling-out section comprises several reflective deflecting surfaces arranged adjacent to each other.

7. The spectacle lens according to claim 1, wherein the coupling-out section is buried in the outer shell.

8. The spectacle lens according to claim 1, wherein the light guiding channel is configured to guide the light bundles through reflections on two opposite boundary surfaces.

9. The spectacle lens according to claim 8, wherein one of the boundary surfaces of the light guiding channel comprises a section of the first side of the outer shell.

10. The spectacle lens according to claim 9, wherein the boundary surface of the light guiding channel which faces away from the first side of the outer shell has an imaging property.

11. The spectacle lens according to claim 8, wherein the boundary surface of the light guiding channel which faces away from the first side of the outer shell has an imaging property.

12. The spectacle lens according to claim 1, wherein the light guiding channel is configured to project with respect to a second side of the outer shell which faces towards the inner shell.

13. The spectacle lens according to claim 1, wherein the opening, when seen in top view, is U-shaped.

14. A display device, comprising:
a holder configured to be fitted on a head of a user;
an image-generating module secured to the holder, which is configured to generate an image; and
an imaging optical system secured to the holder, which comprises a spectacle lens according to claim 1, and which, when the holder is fitted on the head of the user, images the generated image such that the user can perceive the generated image as a virtual image.

15. The display device according to claim 14, in which the imaging optical system comprises an optical element which is joined directly to the outer shell or is formed in one piece with the outer shell.

16. The display device according to claim 15, in which the outer shell, in a view from above, forms an L-shape together with the optical element.

* * * * *